(12) United States Patent
Humburg (10) Patent No.: US 10,488,119 B2
(45) Date of Patent: Nov. 26, 2019

(54) HEAT EXCHANGER UNIT

(71) Applicant: Eberspächer Climate Control Systems GmbH & Co. KG, Esslingen (DE)

(72) Inventor: Michael Humburg, Göppingen (DE)

(73) Assignee: Eberspächer Climate Control Systems GmbH & Co. KG, Esslingen (DE)

(*) Notice: Subject to any disclaimer, the term of this patent is extended or adjusted under 35 U.S.C. 154(b) by 0 days.

(21) Appl. No.: 16/001,196

(22) Filed: Jun. 6, 2018

(65) Prior Publication Data

US 2018/0356160 A1 Dec. 13, 2018

(30) Foreign Application Priority Data

Jun. 7, 2017 (DE) .................. 10 2017 112 530

(51) Int. Cl.
*F28D 7/00* (2006.01)
*F28D 9/00* (2006.01)
*B60H 1/22* (2006.01)
*F28F 9/02* (2006.01)
*F28D 21/00* (2006.01)
(Continued)

(52) U.S. Cl.
CPC ......... *F28D 9/0012* (2013.01); *B60H 1/2209* (2013.01); *F28D 9/0031* (2013.01); *F28F 9/0248* (2013.01); *B60H 2001/2271* (2013.01); *F24H 1/124* (2013.01); *F24H 3/087* (2013.01); *F28D 7/12* (2013.01); *F28D 2021/0024* (2013.01); *F28F 2275/085* (2013.01); *F28F 2275/14* (2013.01)

(58) Field of Classification Search
CPC .... F28D 9/0012; F28D 9/0031; F28D 9/0248;
F28D 7/12; F28D 2021/0024; F28D 1/0435; B60H 1/2209; B60H 2201/2271; F24H 1/124; F24H 3/087; F28F 2275/085; F28F 2275/14; B62D 53/068; F16L 37/088
USPC .......................................................... 165/78
See application file for complete search history.

(56) References Cited

U.S. PATENT DOCUMENTS 5,169,178 A 12/1992 Hunzinger
5,271,646 A 12/1993 Allread et al.
(Continued)

FOREIGN PATENT DOCUMENTS

DE 200 11 475 U1 9/2000
DE 101 55 844 A1 6/2002
(Continued)

*Primary Examiner* — Davis D Hwu
(74) *Attorney, Agent, or Firm* — McGlew and Tuttle, P.C.

(57) ABSTRACT

A heat exchanger unit, especially for a vehicle heater, includes a heat exchanger housing (12) with a heat transfer medium inlet opening (22) and with a heat transfer medium outlet opening (24). At least one connecting branch (26, 28), is inserted or can be inserted into the heat transfer medium inlet opening (22) and the heat transfer medium outlet opening (24). At least one housing locking element meshing recess (34, 36, 38, 40) is provided in association with the at least one connecting branch (26, 28) in the heat exchanger housing (12). A locking element (44), locking the connecting branch (26, 28) on the heat exchanger housing (12), is positioned or can be positioned such that the locking element (44) meshes with the at least one housing locking element meshing recess (34, 36, 38, 40) and with at least one connecting branch locking element meshing recess (42).

20 Claims, 4 Drawing Sheets

(51) Int. Cl.
  *F24H 1/12*  (2006.01)
  *F24H 3/08*  (2006.01)
  *F28D 7/12*  (2006.01)

(56) References Cited

U.S. PATENT DOCUMENTS

| | | | |
|---|---|---|---|
| 5,332,268 A | | 7/1994 | Godeau et al. |
| 5,593,187 A | | 1/1997 | Okuda et al. |
| 5,860,677 A | * | 1/1999 | Martins ................. F16L 37/088 285/26 |
| 6,848,723 B2 | * | 2/2005 | Lamich ................. F16L 37/088 285/305 |
| 7,604,248 B2 | * | 10/2009 | Bromley .............. B62D 53/068 280/149.2 |
| 8,091,617 B2 | * | 1/2012 | Kirschenmann ...... F28D 1/0435 165/144 |
| 9,334,634 B2 | | 5/2016 | Bares et al. |
| 2002/0050348 A1 | | 5/2002 | Watanabe et al. |

FOREIGN PATENT DOCUMENTS

| | | |
|---|---|---|
| DE | 101 44 174 C1 | 10/2002 |
| DE | 10 2004 045061 A1 | 3/2006 |
| DE | 10 2008 037680 A1 | 2/2010 |
| DE | 10 2012 220 792 A1 | 5/2014 |
| DE | 10 2013 221 842 A1 | 4/2015 |
| DE | 10 2013 223241 A1 | 5/2015 |
| DE | 10 2014 219 044 A1 | 3/2016 |
| EP | 2 778 300 A1 | 9/2014 |
| RU | 2269071 C1 | 1/2006 |
| RU | 2374550 C1 | 11/2009 |
| RU | 2589809 C2 | 7/2016 |
| SU | 1838744 A3 | 8/1993 |

* cited by examiner

HEAT EXCHANGER UNIT

CROSS REFERENCE TO RELATED APPLICATIONS

This application claims the benefit of priority under 35 U.S.C. § 119 of German Application 10 2017 112 530.2, filed Jun. 7, 2017, the entire contents of which are incorporated herein by reference.

FIELD OF THE INVENTION

The present invention pertains to a heat exchanger unit, which can be used especially in a vehicle heater in order to transfer, for example, heat generated during the combustion operation to a heat transfer medium, especially a liquid heat transfer medium, flowing through the heat exchanger unit.

BACKGROUND OF THE INVENTION

Such a heat exchanger unit is known, for example, from DE 10 2012 220 792 A1. This heat exchanger unit comprises a pot-like heat exchanger housing with a circumferential wall and with a bottom wall as well as a pot-like inner heat exchanger housing inserted into the outer heat exchanger housing with a circumferential wall and with a bottom wall. A heat transfer medium flow space for liquid heat transfer medium to be heated is formed between the two heat exchanger housings. A heat transfer medium inlet opening as well as a heat transfer medium outlet opening are formed in a housing inlet pipe and in a housing outlet pipe, respectively, on the circumferential wall of the outer heat exchanger housing. The housing inlet pipe and the housing outlet pipe are located, relative to a housing longitudinal axis, in the same length range, i.e., they have the same axial distance from the bottom wall of the outer heat exchanger housing, and are located parallel next to each other in the circumferential direction, so that the openings formed therein have mutually parallel opening longitudinal axes.

To integrate such a heat exchanger unit in the heat transfer medium circuit, lines configured, for example, in the manner of flexible tubes are pushed over the pipes formed on the housing and are fixed thereon by tube clamps or the like.

SUMMARY OF THE INVENTION

An object of the present invention is to provide a heat exchanger unit, especially for a vehicle heater, which provides higher flexibility during the integration into a heat transfer medium circuit.

This object is accomplished according to the present invention by a heat exchanger unit, especially for a vehicle heater, comprising a heat exchanger housing with a heat transfer medium inlet opening and with a heat transfer medium outlet opening, further comprising, associated with at least one opening from among the heat transfer medium inlet opening and the heat transfer medium outlet opening, a connecting branch, which is or can be inserted into the opening, wherein at least one housing locking element meshing recess is provided in the heat exchanger housing in association with the at least one connecting branch and at least one connecting branch locking body meshing recess is provided in the connecting branch, and wherein a locking element locking the connecting branch at the heat exchanger housing is positioned or can be positioned such that it meshes with the at least one housing locking element meshing recess and with the at least one connecting branch locking element meshing recess.

Due to the provision of connecting branches configured as separate components and to the locking of same at the heat exchanger housing by a locking element, which meshes with respective meshing recesses and thus establishes a positive locking, it becomes possible to couple such connecting branches rapidly and reliably with the heat exchanger housing, on the one hand, and to also be able to separate these from the heat exchanger housing in a simple manner, on the other hand.

It is proposed for a stable coupling of the connecting branches with the heat exchanger housing that the heat exchanger housing have a pot-like configuration with a circumferential wall and with a bottom wall; that the heat transfer medium inlet opening be formed in a housing inlet pipe provided on the circumferential wall, and that the heat transfer medium outlet opening be formed in a housing outlet pipe provided on the circumferential wall, and that at least one housing locking element meshing recess be provided in at least one pipe from among the housing inlet pipe and the housing outlet pipe.

Reliable locking of a respective connecting branch in the opening receiving same can be guaranteed, for example, by two housing locking element meshing recesses located opposite each other being provided on at least one pipe from among the housing inlet pipe and the housing outlet pipe.

To make it possible to preset a defined positioning for the connecting branch when inserting a connecting branch into the opening receiving same, provisions may be made for at least one and preferably each connecting branch to have an insertion stop, and for the insertion stop to interact with the counter-insertion stop provided on the heat exchanger housing when the connecting branch is inserted into the associated pipe from among the housing inlet pipe and the housing outlet pipe such that the at least one connecting branch locking element meshing recess provided on the connecting branch is arranged flush with the at least one housing locking element meshing recess and the locking element is positioned or can be positioned such that it meshes with the at least one connecting branch locking element meshing recess and with the at least one housing locking element meshing recess.

The connection of a connecting branch to the heat exchanger housing can be supported in an especially simple manner if the at least one connecting branch locking element meshing recess is provided in at least one and preferably each connecting branch by a circumferential groove extending preferably over the entire circumference of the connecting branch.

To minimize the number of components necessary for building the heat exchanger unit, it is proposed that the connecting branch, which is inserted or can be inserted into the heat transfer medium inlet opening, and the connecting branch, which is inserted or can be inserted into the heat transfer medium outlet opening, be locked or be able to be locked on the heat exchanger housing by a common locking element, the locking element having, in association with each connecting branch, a connecting branch locking area and a housing locking area for locking the locking element in relation to the heat exchanger housing in a locked state locking at least one connecting branch on the heat exchanger housing.

Provisions may be made for this, for example, for at least one and preferably each connecting branch locking area to have an essentially U-shaped configuration and to have two locking legs that are positioned or can be positioned such that they mesh with a housing locking element meshing recess and with a connecting branch locking element meshing recess, respectively.

To prevent an unintended separation of the locking element from the heat exchanger housing, the housing locking area may be configured in an essentially U-shaped manner connecting the two connecting branch locking areas to one another. Further, a locking projection extending behind the counter-locking area in the locked state may be provided at the heat exchanger housing.

The locking element may be formed from a preferably bent metallic material in a configuration that can be manufactured in a simple manner.

To guarantee the interaction of a locking element with two connecting branches in a simple manner, it is proposed that the heat transfer medium inlet opening and the heat transfer medium outlet opening be provided at the heat exchanger housing with opening longitudinal axes that are essentially parallel to one another.

To facilitate the integration of the heat exchanger unit into a heat transfer medium circuit, it is proposed that a connecting branch be mounted rotatably at the locking element locking said connecting branch in at least one opening from among the heat transfer medium inlet opening and the heat transfer medium outlet opening.

The present invention will be described below in detail with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
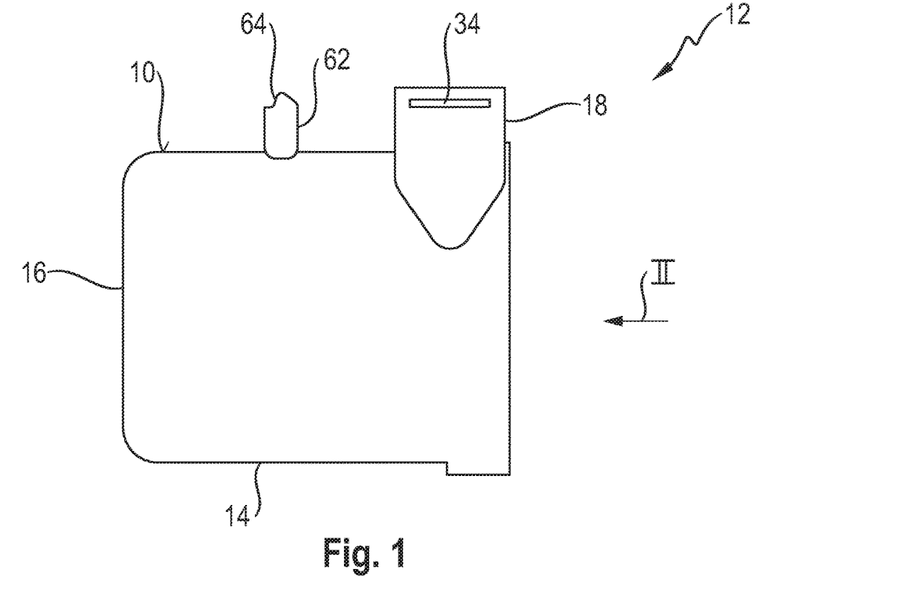
FIG. 1 is a lateral view of a heat exchanger housing.
Figure 2:
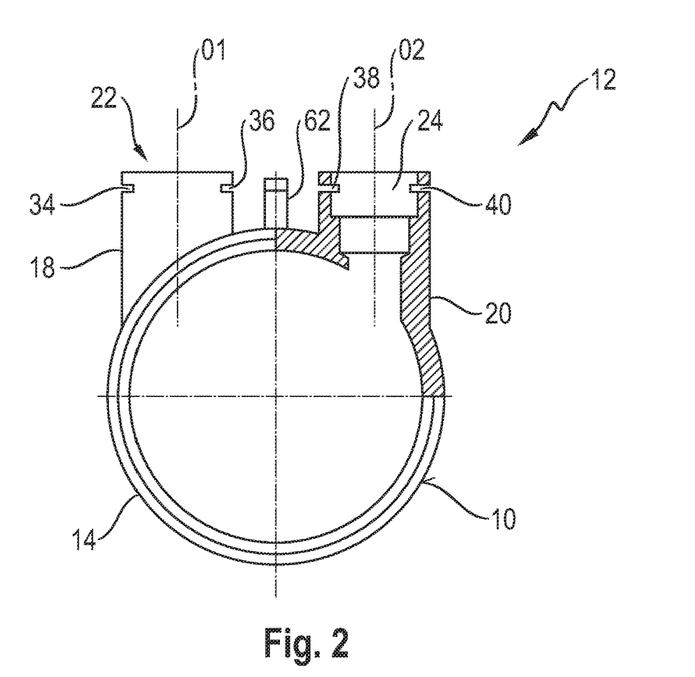
FIG. 2 is a partially cut-away axial view of the heat exchanger housing according to FIG. 1, viewed in the viewing direction II in FIG. 1.

Referring to the drawings, FIGS. 1 and 2 show a heat exchanger housing of a heat exchanger unit 12 for a vehicle heater, which is operated, for example, with fuel, said heat exchanger housing being generally designated by 10. The heat exchanger housing 10, manufactured, for example, from a plastic material or a metallic material, has a pot-like structure with a circumferential wall 14 and with a bottom wall 16, which adjoins same or is made integrally with same. The heat exchanger housing 10 forms an outer heat exchanger housing, into which an inner heat exchanger housing likewise having a pot-like configuration can be inserted, so that these two heat exchanger housings together form a flow space for a heat transfer medium to be heated, for example, the cooling liquid in a coolant circuit of an internal combustion engine. The heat exchanger unit 12 is opened on the side positioned on the right side in FIG. 1 and shown in a top view in FIG. 2 for receiving or being connected to a burner assembly unit.

A housing inlet pipe 18 and a housing outlet pipe 20 are provided preferably as integral components of the heat exchanger housing 10 at the circumferential wall 14 at circumferentially spaced locations from one another and at equally spaced locations from the bottom wall 16. A heat transfer medium inlet opening 22 is formed in the housing inlet pipe 18 and is open towards the volume surrounded by the heat exchanger housing 10. A heat transfer medium outlet opening 24 is formed in the housing outlet pipe 20 and is open towards the volume surrounded by the heat exchanger housing 10. The heat transfer medium inlet opening 22 and the heat transfer medium outlet opening 24 have opening longitudinal axes O1, O2, which are parallel to one another. The two openings 22, 24 are preferably shaped and dimensioned such that they are essentially identical to one another.

Figure 3:
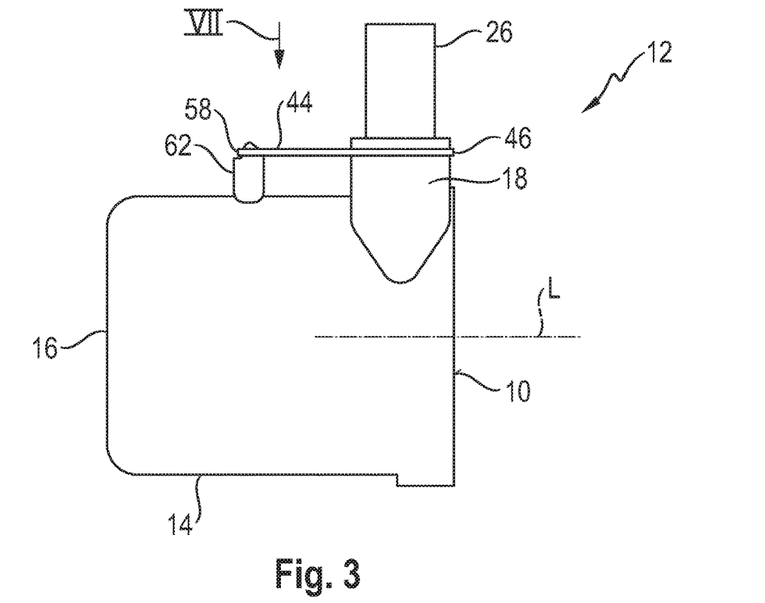
FIG. 3 is a view of the heat exchanger housing corresponding to FIG. 1 with connecting branches inserted into same.
Figure 4:
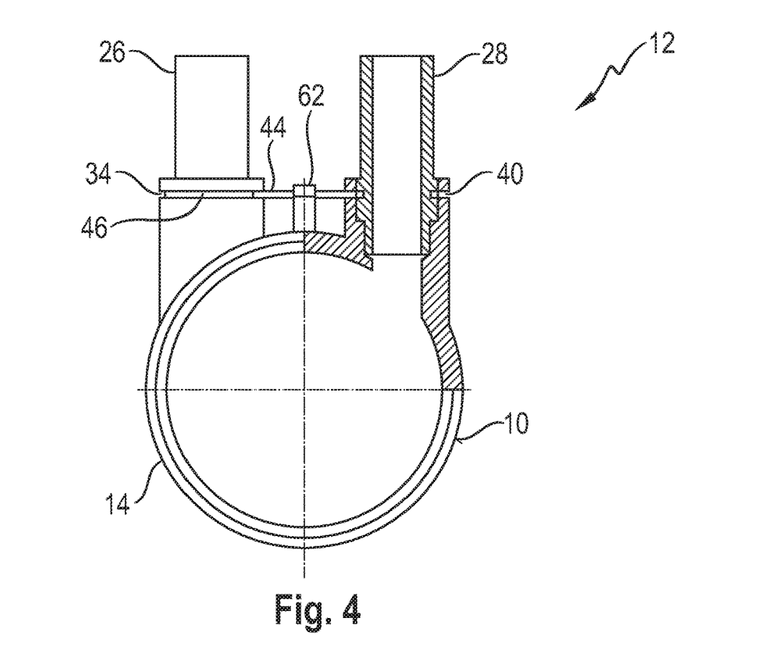
FIG. 4 is a view of the heat exchanger housing corresponding to FIG. 2 with a connecting branch inserted into same.
Figure 5A:
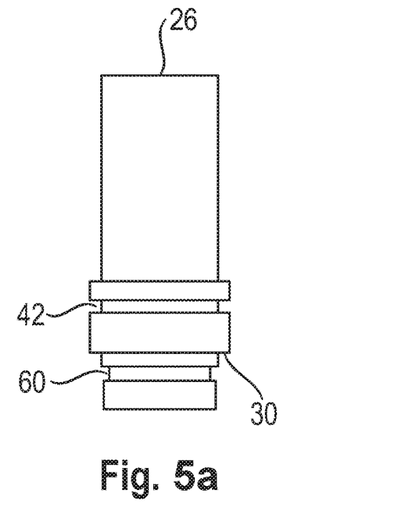
FIG. 5a is a lateral view of a connecting branch.
Figure 5B:
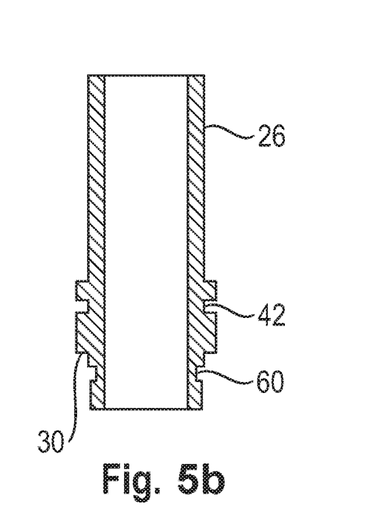
FIG. 5b is a longitudinal sectional view of the connecting branch.

FIGS. 3 and 4 show the heat exchanger housing 10 with connecting branches 26, 28, which are manufactured, for example, from a plastic material or a metallic material, inserted into the two openings 22, 24. The connecting branches 26, 28, which have, just like the openings 22, 24, mutually essentially identical configurations to one another, especially in their areas inserted into these openings 22, 24, have an insertion stop 30, which can also be seen in FIGS. 5a and 5b and which is in contact with counter-insertion stop 32 when the connecting branch 26, 28 is fully inserted into the respective opening 22, 24. It should be noted in this connection that in FIGS. 5a and 5b only the connecting branch 26 is shown as an example of the two connecting branches 26, 28, which have an essentially mutually identical configuration. The interaction of this connecting branch 26 with the heat transfer medium inlet opening 22 receiving same corresponds to the interaction of the heat transfer medium outlet opening 24 receiving the connecting branch 28 with this connecting branch 28.

Housing locking element meshing recesses 34, 36 and 38, 40, respectively, having each a slot-like configuration, are formed in the housing inlet pipe 18 and in the housing outlet pipe 20 on two sides located opposite each other in relation to the respective opening longitudinal axis O1, O2. A connecting branch locking element meshing recess 42 is formed in the respective length area to be inserted into one of the openings 22, 24 on each of the connecting branches 26, 28. This meshing recess 42 is preferably configured as a groove extending around the entire outer circumference of a respective connecting branch 26, 28. With the connecting branch 26, 28 inserted into a respective opening 22, 24, the respective connecting branch locking element meshing recess 42 is flush—in the direction of the respective opening longitudinal axis O1, O2—with the housing locking element meshing recesses 34, 36 and 38, 40, respectively, which are formed in the associated pipe from among the housing inlet pipe 18 and the housing outlet pipe 20. Since the connecting branch locking element meshing recess 42 is configured as a circumferential groove on each of the connecting branches 26, 28, it is not necessary to pay attention to a special rotational positioning of the connecting branches 26, 28 to achieve this flush arrangement.

Figure 6:
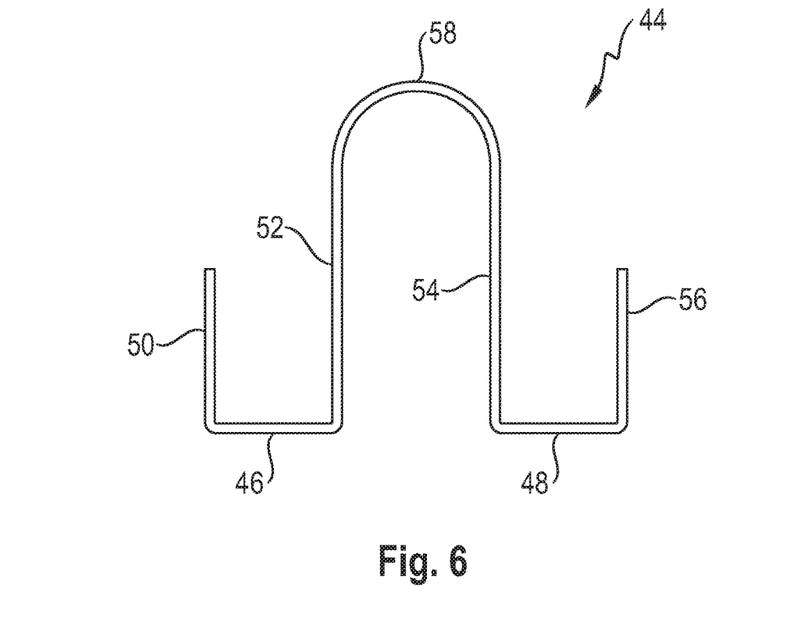
FIG. 6 is a locking element.
Figure 7:
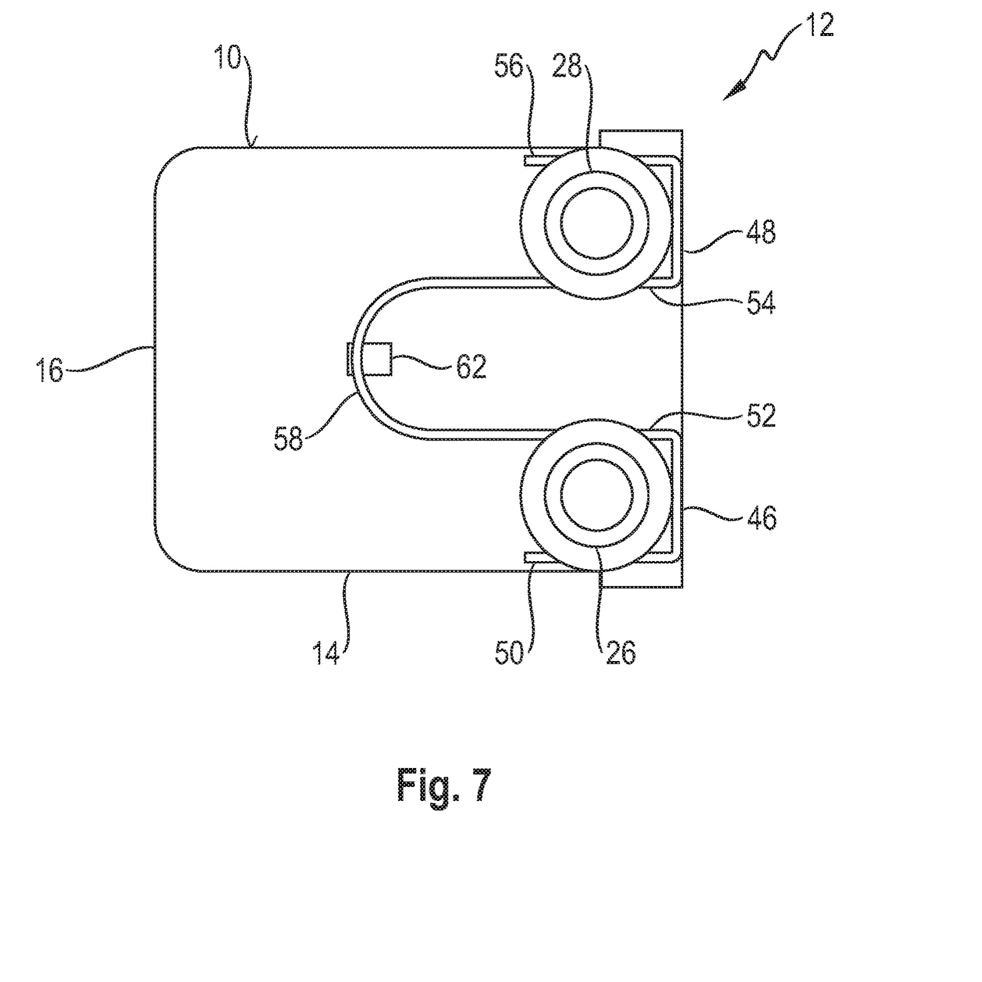
FIG. 7 is the heat exchanger housing according to FIG. 3, viewed in the viewing direction VII in FIG. 3.

FIG. 6 shows a locking element 44 bent, for example, from a wire material. The locking element 44 has, in association with each connecting branch 26, 28 to be locked by same, a connecting branch locking area 46, 48 with an essentially U-shaped form. Each connecting branch locking area 46, 48 has two locking legs 50, 52 and 54, 56, respectively, which are, e.g., essentially parallel to one another. An essentially likewise U-shaped housing locking area 58 of the locking element 44 is provided, continuing the locking element 44.

When assembling the heat exchanger housing 10 with the two connecting branches 26, 28, the connecting branches 26, 28 are first inserted into the heat transfer medium inlet opening 22 and into the heat transfer medium outlet opening 24 until the insertion stops 30 thereof come into contact with the counter-insertion stops 42. A sealing element, which is, for example, O-shaped and is received in another circumferential grooves 60 of the connecting branches 26, 28, generates a fluid-tight closure in this state. After the two connecting branches 26, 28 have been inserted into the housing inlet pipe 18 and the housing outlet pipe 20, the locking element 44 is pushed over the housing inlet pipe 18 and the housing outlet pipe 20 with its respective connecting branch locking area 46, 48 from the right in the view shown in FIG. 1 such that the locking legs 50, 52 mesh with the housing locking element meshing recesses 34, 36 as well as with the connecting branch locking element meshing recess 42 of the connecting branch 26 and the locking legs 54, 56 mesh with the housing locking element meshing recesses 38, 40 as well as with the connecting branch locking element meshing recess 42 of the connecting branch 28. A positive-locking connection of the connecting branches 26, 28 to the heat exchanger housing 10 is consequently generated by the housing locking areas 46, 48.

With the locking element 44 pushed completely over and consequently with the connecting branch locking area 46, 48 in contact with the housing inlet pipe 18 and with the housing outlet pipe 20 in the direction of the housing longitudinal axis L, a locking projection provided, for example, integrally on the circumferential wall 14 of the heat exchanger housing 10 extends behind the housing locking area 58, so that the locking element 44 cannot be displaced in the direction of the housing longitudinal axis L in relation to the heat exchanger housing 10. The locking element 44 can be brought into this state by this element being deflected at right angles to the push-over direction, i.e., at right angles to the housing longitudinal axis L, and by being moved with its housing locking area 58 over the locking projection 62. If the locking element 44 is moved to a sufficiently great extent over the locking projection 62, the force deflecting this locking element can be abolished, so that the locking element 44 returns to its initial shape under its own prestress and comes into contact with a locking bevel 64 of the locking projection 62. The locking element 44 returning to its initial shape thus generates a force moving or prestressing it into its completely pushed-over position.

It is possible with the configuration according to the present invention of a heat exchanger unit in a simple manner to connect the connecting branch 26, 28, which are connected to connection lines in a firm and stable manner, to the heat exchanger unit 12 after the latter or a heater having this heat exchanger unit 12 has been integrated in a vehicle. The connecting branches and hence the connection lines connected to it can likewise be uncoupled from the heat exchanger unit in a simple manner if this is necessary, for example, for repairs. It is especially advantageous that the connecting branches 26, 28 are, in principle, rotatable in the openings 22, 24 receiving them even when the locking element 44 is applied, so that forcing of lines connected to these connecting branches 26, 28 is avoided.

It should finally be noted that the above-described two pipes formed on the heat exchanger housing may, of course, also be transposed in respect to the feed or removal of heat transfer medium.

While specific embodiments of the invention have been shown and described in detail to illustrate the application of the principles of the invention, it will be understood that the invention may be embodied otherwise without departing from such principles.

What is claimed is:

1. A heat exchanger unit comprising:
   a heat exchanger housing with a heat transfer medium inlet opening and with a heat transfer medium outlet opening;
   a connecting branch insertable into at least one opening from among the heat transfer medium inlet opening and the heat transfer medium outlet opening;
   at least one housing locking element meshing recess in the heat exchanger housing, the at least one housing locking element meshing recess being associated with the at least one connecting branch;
   at least one connecting branch locking element meshing recess provided in the connecting branch; and
   a locking element locking the connecting branch on the heat exchanger housing, the locking element being positioned to mesh with the at least one housing locking element meshing recess and to mesh with the at least one connecting branch locking element meshing recess.

2. A heat exchanger unit in accordance with claim 1, wherein:
   the heat exchanger housing comprises a pot-shaped configuration with a circumferential wall and with a bottom wall;
   the heat transfer medium inlet opening is formed in a housing inlet pipe provided on the circumferential wall;
   the heat transfer medium outlet opening is formed in another housing outlet pipe provided on the circumferential wall; and
   the at least one housing locking body meshing recess is provided in at least one pipe from among the housing inlet pipe and the housing outlet pipe.

3. A heat exchanger unit in accordance with claim 2, further comprising another housing locking element meshing recess to provide two mutually opposite housing locking element meshing recesses in at least one pipe from among the housing inlet pipe and the housing outlet pipe.

4. A heat exchanger unit in accordance with claim 2, wherein:
   the at least one connecting branch comprises an insertion stop;
   a counter-insertion stop is provided on the heat exchanger housing;
   with the at least one connecting branch inserted into one of the housing inlet pipe and the housing outlet pipe, the insertion stop interacts with the counter-insertion stop such that the at least one connecting branch locking element meshing recess provided on the connecting branch is arranged flush with the at least one housing locking element meshing recess and the locking element is positioned or is positionable to mesh with the at least one connecting branch locking element meshing recess and to mesh with the at least one housing locking element meshing recess.

5. A heat exchanger unit in accordance with claim 1, wherein the at least one connecting branch locking element meshing recess comprises a circumferential groove extending over an entire circumference of the connecting branch.

6. A heat exchanger unit in accordance with claim 1, further comprising:
  another connecting branch insertable into the heat transfer medium inlet opening or the heat transfer medium outlet opening;
  another housing locking element meshing recess in the heat exchanger housing, the other housing locking element being associated with the other connecting branch;
  another connecting branch locking element meshing recess provided in the other connecting branch, wherein:
  the at least one connecting branch is inserted into the heat transfer medium inlet opening;
  the other connecting branch is inserted into the heat transfer medium outlet opening;
  the at least one connecting branch and the other connecting branch are locked at the heat exchanger housing by the locking element as a common locking element;
  the common locking element has, in association with each of the at least one connecting branch and the other connecting branch, a connecting branch locking area and a housing locking area for locking the locking element in relation to the heat exchanger housing in a locked state and locking the at least one connecting branch and the other connecting branch at the heat exchanger housing.

7. A heat exchanger unit in accordance with claim 6, wherein each connecting branch locking area comprises an essentially U-shaped configuration and has two locking legs that are positioned or can be positioned such that the two locking legs mesh with the housing locking element meshing recess and mesh with a connecting branch locking element meshing recess, respectively.

8. A heat exchanger unit in accordance with claim 6, further comprising a locking projection extending behind the housing locking area in a locked state and provided on the heat exchanger housing, wherein the housing locking area has an essentially U-shaped configuration connecting the two connecting branch locking areas to one another.

9. A heat exchanger unit in accordance with claim 1, wherein the locking element is made of a bent metallic material.

10. A heat exchanger unit in accordance with claim 1, wherein the heat transfer medium inlet opening and the heat transfer medium outlet opening on the heat exchanger housing are provided with essentially parallel opening longitudinal axes.

11. A heat exchanger unit in accordance with claim 1, wherein the at least one connecting branch is provided rotatably at the locking element locking the at least one connecting branch on the heat exchanger housing in at least one of the heat transfer medium inlet opening and the heat transfer medium outlet opening.

12. A heat exchanger unit comprises:
  a heat exchanger housing with a heat transfer medium inlet opening and with a heat transfer medium outlet opening;
  a connecting branch insertable into one of the heat transfer medium inlet opening and the heat transfer medium outlet opening;
  a housing locking element engagement recess at the housing and at one of the heat transfer medium inlet opening and the heat transfer medium outlet opening;
  a connecting branch locking element engagement recess provided in the connecting branch; and
  a locking element locking the connecting branch on the heat exchanger housing, the locking element engaging each of the housing locking element engagement recess and the connecting branch locking element engagement recess to lock the connecting branch in an inserted position in said one of the heat transfer medium inlet opening and the heat transfer medium outlet opening.

13. A heat exchanger unit in accordance with claim 12, further comprising:
  another connecting branch insertable into another of the heat transfer medium inlet opening and the heat transfer medium outlet opening;
  another housing locking element engagement recess at the housing and at the other heat transfer medium inlet opening and the heat transfer medium outlet opening;
  another connecting branch locking element engagement recess provided in the other connecting branch, wherein:
  the heat exchanger housing comprises a pot-shaped configuration with a circumferential wall and with a bottom wall;
  the heat transfer medium inlet opening is formed in a housing inlet pipe provided on the circumferential wall;
  the heat transfer medium outlet opening is formed in another housing outlet pipe provided on the circumferential wall;
  the housing locking body engagement recess is provided in the housing inlet pipe; and
  the other housing locking body engagement recess is provided in the housing outlet pipe.

14. A heat exchanger unit in accordance with claim 13, the housing locking body engagement recess and the other housing locking element engagement recess are provided as two mutually opposite and aligned housing locking element engagement recesses.

15. A heat exchanger unit in accordance with claim 14, wherein:
  the connecting branch is inserted into the heat transfer medium inlet opening;
  the other connecting branch is inserted into the heat transfer medium outlet opening;
  the at least one connecting branch and the another connecting branch are locked at the heat exchanger housing by the locking element as a common locking element;
  the common locking element has, in association with each of the connecting branch and the other connecting branch, a connecting branch locking area and a housing locking area for locking the locking element in relation to the heat exchanger housing in a locked state and locking the at least one connecting branch and the other connecting branch at the heat exchanger housing.

16. A heat exchanger unit in accordance with claim 15, wherein each connecting branch locking area comprises an essentially U-shaped configuration and has two locking legs that are positioned or can be positioned such that the two locking legs mesh with the housing locking element engagement recess and mesh with a connecting branch locking element engagement recess, respectively.

17. A heat exchanger unit in accordance with claim 16, further comprising a locking projection extending behind the housing locking area in a locked state and provided on the heat exchanger housing, wherein the housing locking area has an essentially U-shaped configuration connecting the two connecting branch locking areas to one another.

18. A heat exchanger unit in accordance with claim 15, wherein the heat transfer medium inlet opening and the heat transfer medium outlet opening on the heat exchanger housing are provided with essentially parallel opening longitudinal axes.

19. A heat exchanger unit in accordance with claim 15, wherein the at least one connecting branch is provided rotatably at the locking element locking the at least one connecting branch on the heat exchanger housing in at least one of the heat transfer medium inlet opening and the heat transfer medium outlet opening.

20. A heat exchanger unit in accordance with claim 12, wherein:
- the connecting branch comprises an insertion stop;
- a counter-insertion stop is provided on the heat exchanger housing;
- with the connecting branch inserted into one of the housing inlet pipe and the housing outlet pipe, the insertion stop interacts with the counter-insertion stop such that the connecting branch locking element engagement recess is arranged flush with the at least one housing locking element engagement recess and the locking element is positioned or is positionable to mesh with the connecting branch locking element engagement recess and with the housing locking element engagement recess.

\* \* \* \* \*